US012242220B2

(12) United States Patent
Yokoi et al.

(10) Patent No.: US 12,242,220 B2
(45) **Date of Patent: *Mar. 4, 2025**

(54) IMAGE FORMING APPARATUS WITH A MEMORY POSITIONED ON A DRUM FRAME

(71) Applicant: BROTHER KOGYO KABUSHIKI KAISHA, Nagoya (JP)

(72) Inventors: Junichi Yokoi, Nagoya (JP); Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,208

(22) Filed: Nov. 6, 2023

(65) Prior Publication Data

US 2024/0142911 A1 May 2, 2024

Related U.S. Application Data

(63) Continuation of application No. 17/686,582, filed on Mar. 4, 2022, now Pat. No. 11,853,000, which is a (Continued)

(30) Foreign Application Priority Data

Mar. 29, 2019 (JP) ................................ 2019-065282

(51) Int. Cl.
*G03G 21/16* (2006.01)

(52) U.S. Cl.
CPC ..... *G03G 21/1647* (2013.01); *G03G 21/1671* (2013.01); *G03G 21/1676* (2013.01)

(58) Field of Classification Search
CPC ........... G03G 21/1647; G03G 21/1671; G03G 21/1676; G03G 21/1885; G03G 21/1842
See application file for complete search history.

(56) References Cited

U.S. PATENT DOCUMENTS 10,935,925 B2 3/2021 Yokoi et al.
11,294,325 B2 4/2022 Yokoi et al.
(Continued)

FOREIGN PATENT DOCUMENTS

JP 4-331959 A 11/1992
JP 2000-75767 A 3/2000
(Continued)

OTHER PUBLICATIONS

International Search Report issued in corresponding International Patent Application No. PCT/JP2019/022115, Jul. 30, 2019.
(Continued)

*Primary Examiner* — Sandra Brase
(74) *Attorney, Agent, or Firm* — MERCHANT & GOULD P.C.

(57) ABSTRACT

An image forming apparatus including a main body casing, a drum cartridge, a developing cartridge, and an intermediate transfer belt. The drum cartridge includes a photosensitive drum, a drum frame, and a first memory. The intermediate transfer belt is positioned above of the drum cartridge and the developing cartridge in a state where the drum cartridge and the developing cartridge are attached to the main body casing. The drum frame includes a first end and a second end being apart from the first end in an up-down direction. The photosensitive drum is positioned at the first end. The first memory is positioned at the second end.

3 Claims, 7 Drawing Sheets

Related U.S. Application Data continuation of application No. 17/176,259, filed on Feb. 16, 2021, now Pat. No. 11,294,325, which is a continuation of application No. 16/788,878, filed on Feb. 12, 2020, now Pat. No. 10,935,925.

(56) References Cited

U.S. PATENT DOCUMENTS

| | | | | |
|---|---|---|---|---|
| 11,853,000 | B2 * | 12/2023 | Yokoi | G03G 21/1647 |
| 2006/0024080 | A1 | 2/2006 | Chadani | |
| 2007/0146826 | A1 | 6/2007 | Inao et al. | |
| 2008/0124133 | A1 | 5/2008 | Yoshizawa et al. | |
| 2008/0267666 | A1 | 10/2008 | Shirokoshi | |
| 2012/0148289 | A1 | 6/2012 | Lee et al. | |
| 2014/0169824 | A1 | 6/2014 | Seto et al. | |
| 2016/0349699 | A1 | 12/2016 | Miyamoto et al. | |
| 2017/0031275 | A1 | 2/2017 | Ohkubo | |
| 2017/0227926 | A1 | 8/2017 | Shimizu | |
| 2017/0248906 | A1 | 8/2017 | Tanabe et al. | |
| 2017/0248910 | A1 | 8/2017 | Hayakawa | |
| 2018/0120758 | A1 | 5/2018 | Zensai et al. | |
| 2018/0267460 | A1 | 9/2018 | Shigemori et al. | |
| 2018/0284647 | A1 | 10/2018 | Yokoi | |
| 2018/0364613 | A1 | 12/2018 | Momoka | |
| 2019/0227476 | A1 | 7/2019 | Hayashi | |
| 2020/0096938 | A1 | 3/2020 | Endo | |

FOREIGN PATENT DOCUMENTS

| | | | |
|---|---|---|---|
| JP | 2001-92225 | A | 4/2001 |
| JP | 2006-119553 | A | 5/2006 |
| JP | 2007-52056 | A | 3/2007 |
| JP | 2007-171799 | A | 7/2007 |
| JP | 2009-8698 | A | 1/2009 |
| JP | 2014-119505 | A | 6/2014 |
| JP | 2014-119516 | A | 6/2014 |
| JP | 2016-224221 | A | 12/2016 |
| JP | 2017-090692 | A | 5/2017 |
| JP | 2017-173805 | A | 9/2017 |
| JP | 2018-72677 | A | 5/2018 |
| JP | 2018-155780 | A | 10/2018 |
| JP | 2018-173480 | A | 11/2018 |
| JP | 2018-173526 | A | 11/2018 |
| JP | 2018-205537 | A | 12/2018 |

OTHER PUBLICATIONS

Written Opinion issued in corresponding International Patent Application No. PCT/JP2019/022115, Jul. 30, 2019.
Japanese Office Action issued in corresponding Japanese Patent Application No. 2019-065282, mailed Sep. 7, 2021.
Office Action (Notice of Reasons for Refusal) issued in corresponding Japanese Patent Application No. 2022-001772, Jan. 24, 2023.
Office Action issued in the corresponding Japanese Patent Application No. 2023-129017, Apr. 16, 2024.

* cited by examiner

IMAGE FORMING APPARATUS WITH A MEMORY POSITIONED ON A DRUM FRAME

CROSS-REFERENCE TO RELATED APPLICATIONS

This application is a continuation of U.S. patent application Ser. No. 17/686,582, filed Mar. 4, 2022, now U.S. Pat. No. 11,853,000, which is a continuation of U.S. patent application Ser. No. 17/176,259 filed Feb. 16, 2021, now U.S. Pat. No. 11,294,325, which is a continuation of U.S. patent application Ser. No. 16/788,878 filed Feb. 12, 2020, now U.S. Pat. No. 10,935,925, which claims priority from Japanese Patent Application No. 2019-065282 filed on Mar. 29, 2019, the contents of which are incorporated herein by reference in their entirety.

TECHNICAL FIELD

Aspects of the disclosure relate to an image forming apparatus including a drum cartridge and a developing cartridge.

BACKGROUND

Some known image forming apparatus is configured such that a drum cartridge and a developing cartridge are each insertable into and removable from a main body casing of the image forming apparatus in an axial direction extending parallel to a rotation axis of a photosensitive drum.

Some known drum cartridge removably insertable into an image forming apparatus includes an IC chip (i.e., a memory).

In such a case, the image forming apparatus is configured to read information about a drum cartridge attached to the image forming apparatus.

The memory is positioned at a leading end of the drum cartridge in an inserting direction.

SUMMARY

A drum cartridge and/or a developing cartridge may include, at its leading end in the inserting direction, a plurality of components or parts, such as a coupling and electrodes, to be contacted to or connected to the main body casing of the image forming apparatus.

Such a configuration may cause difficulty in placing a memory at the leading end of the drum cartridge or the developing cartridge.

Accordingly, aspects of the disclosure provide an image forming apparatus including a drum cartridge and a developing cartridge respectively insertable into and removable from a main body casing of the image forming apparatus in an axial direction of a photosensitive drum, wherein each of the drum cartridge and the developing cartridge may include a memory at an end other than its leading end in an inserting direction.

According to an illustrative embodiment of the present disclosure, there is provided an image forming apparatus including a main body casing, a drum cartridge, a developing cartridge, and an intermediate transfer belt. The drum cartridge is removably insertable into to the main body casing in a first direction. The drum cartridge includes a photosensitive drum, a drum frame, and a first memory. The photosensitive drum is rotatable about a first axis extending in the first direction. The drum frame is rotatably supporting the photosensitive drum. The first memory is configured to store drum cartridge information. The developing cartridge is removably insertable into the main body casing in the first direction. The developing cartridge includes a developing roller, and a developing frame, and a second memory. The developing roller is rotatable about a second axis extending in the first direction. The developing frame is configured to store developer therein. The second memory is configured to store developing cartridge information. The intermediate transfer belt is positioned above of the drum cartridge and the developing cartridge in a state where the drum cartridge and the developing cartridge are attached to the main body casing. The drum frame includes a first end and a second end being apart from the first end in an up-down direction. The photosensitive drum is positioned at the first end. The first memory is positioned at the second end.

DETAILED DESCRIPTION

An illustrative embodiment will be described with reference to the accompanying drawings.

Figure 1:
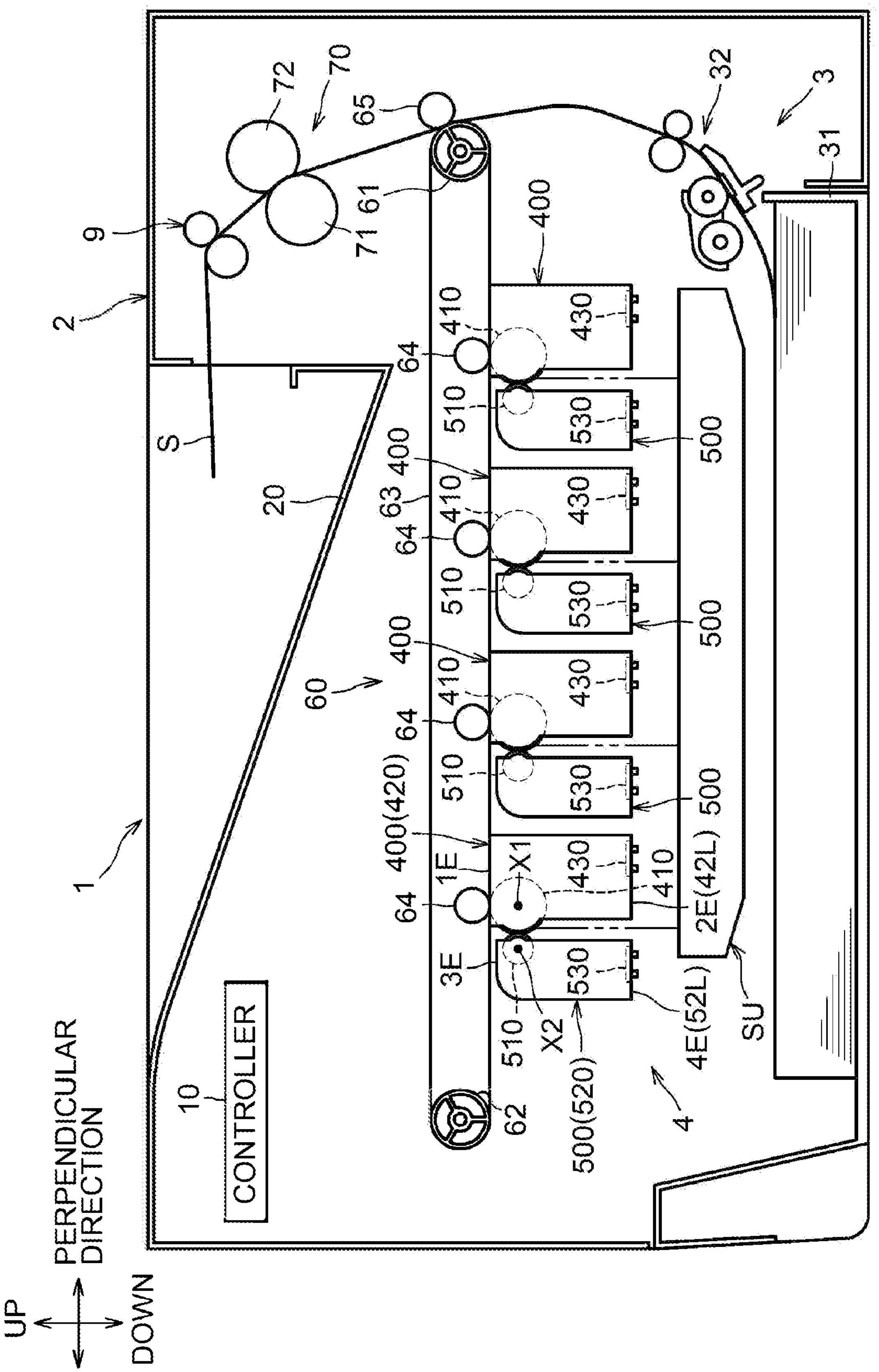
FIG. 1 illustrates a general configuration of an image forming apparatus according to an illustrative embodiment of the disclosure.

As illustrated in FIG. 1, an image forming apparatus 1 may be a color printer. The image forming apparatus 1 includes a main body casing 2, a feed unit 3, an image forming unit 4, discharge rollers 9, and a controller 10. The feed unit 3 is configured to feed a sheet S to the image forming unit 4. The image forming unit 4 is configured to form an image onto a sheet S. The discharge rollers 9 are configured to convey a sheet S to discharge the sheet S to the outside of the main body casing 2.

The main body casing 2 includes a sheet receiving portion 20 at its top. The sheet receiving portion 20 is configured to receive a discharged sheet S. The sheet receiving portion 20 is positioned above an intermediate transfer belt 63.

The feed unit 3 is positioned in a lower portion of the main body casing 2. The feed unit 3 includes a feed tray 31 and a feed mechanism 32. The feed tray 31 is insertable into and removable from the main body casing 2. The feed mechanism 32 is configured to feed a sheet S from the feed tray 31 to the image forming unit 4.

The image forming unit 4 includes a plurality of drum cartridges 400, a plurality of developing cartridges 500, an exposure device SU, a transfer unit 60, and a fixing unit 70. The number of drum cartridges 400 and the number of the developing cartridges 500 each correspond to the number of toner colors. In the illustrative embodiment, for example, the drum cartridges 400 may include four drum cartridges 400 and the developing cartridges 500 may include four developing cartridges 500. The drum cartridges 400 and the developing cartridges 500 are arranged side by side in the image forming unit 4.

Each drum cartridge 400 includes a photosensitive drum 410, a drum frame 420, a charger, and a first memory 430. The photosensitive drum 410 is rotatable about a first axis X1 extending in an axial direction. In the description below, a direction parallel to the first axis X1 that may be a rotation axis of the photosensitive drum 410 may be simply referred to as the axial direction. The photosensitive drums 410 are arranged in a direction perpendicular to both of the axial direction and an up-down direction (hereinafter, simply referred to as the perpendicular direction). The drum frame 420 supports the photosensitive drum 410 rotatably.

The first memory 430 is configured to store drum-cartridge information about the photosensitive drum 410. The drum-cartridge information may be, for example, the total number of rotations of a photosensitive drum 410 in a corresponding drum cartridge 400.

In a state where the drum cartridges 400 and the developing cartridges 500 are attached to the main body casing 2, the drum cartridges 400 and the developing cartridges 500 are alternately arranged in the perpendicular direction.

Each developing cartridge 500 includes a developing frame 520, a developing roller 510, and a second memory 530. The developing roller 510 is rotatable about a second axis X2 extending in the axial direction. The developing rollers 510 are arranged in the perpendicular direction.

The second memory 530 is configured to store developing-cartridge information about at least one of toner or a developing roller 510. The developing-cartridge information may be, for example, the total number of rotations of a developing roller 510 in a corresponding developing cartridge 500 and/or an amount of toner remaining in a developing frame 520. In other embodiments, for example, the developing-cartridge information may include information representing an amount of toner used from an original amount of toner stored in the developing frame 520. In such a case, the information representing the amount of toner used may be, for example, information representing a dot count indicating the number of printed dots or a usage amount of toner used in printing.

The exposure device SU is positioned below the drum cartridges 400.

The exposure device SU is configured to irradiate a circumferential surface of each photosensitive drum 410 with a laser beam (indicated by a double-botted-and-dashed line).

The transfer unit 60 is positioned between the photosensitive drums 410 and the sheet receiving portion 20 in the up-down direction. The transfer unit 60 includes a drive roller 61, a driven roller 62, the intermediate transfer belt 63, a plurality of, for example, four, first transfer rollers 64, and a second transfer roller 65.

The intermediate transfer belt 63 may be an endless belt. In a state where the drum cartridges 400 and the developing cartridges 500 are attached to the main body casing 2, the intermediate transfer belt 63 is positioned above the drum cartridges 400 and the developing cartridges 500. In such a state, the intermediate transfer belt 63 contacts the circumferential surface of each photosensitive drum 410. The intermediate transfer belt 63 is looped over the drive roller 61 and the driven roller 62.

The first transfer rollers 64 are positioned inside the loop of the intermediate transfer belt 63. The first transfer rollers 64 and the respective corresponding photosensitive drums 410 sandwich the intermediate transfer belt 63 therebetween.

The second transfer roller 65 is positioned outside the loop of the intermediate transfer belt 63. The second transfer roller 65 and the drive roller 61 sandwich the intermediate transfer belt 63 therebetween.

The fixing unit 70 is positioned above the intermediate transfer belt 63. The fixing unit 70 includes a heat roller 71 and a pressure roller 72. The pressure roller 72 is configured to be pressed toward the heat roller 71.

The controller 10 includes a CPU, a RAM, a ROM, and an input/output circuit. The controller 10 is configured to execute calculation based on the information about the attached cartridges and programs and data stored in the ROM to execute a printing control.

In the image forming unit 4, first, the charger charges the circumferential surface of each photosensitive drum 410. Thereafter, the exposure device SU exposes the circumferential surface of each photosensitive drum 410. Thus, an electrostatic latent image is formed on the circumferential surface of each photosensitive drum 410.

After that, each developing roller 510 supplies toner onto the electrostatic latent image formed on a corresponding photosensitive drum 410, thereby forming a toner image on the circumferential surface of each photosensitive drum 410.

Each first transfer roller 64 then transfers the toner image onto an outer circumferential surface of the intermediate transfer belt 63 from the circumferential surface of the corresponding photosensitive drum 410.

When a sheet S passes between the intermediate transfer belt 63 and the second transfer roller 65, the second transfer roller 65 transfers the overlapping toner images onto the sheet S from the outer circumferential surface of the intermediate transfer belt 63. Thereafter, the fixing unit 70 fixes the transferred toner images onto the sheet S. The discharge rollers 9 then convey the sheet S to discharge the sheet S to the sheet receiving portion 20.

Figure 2:
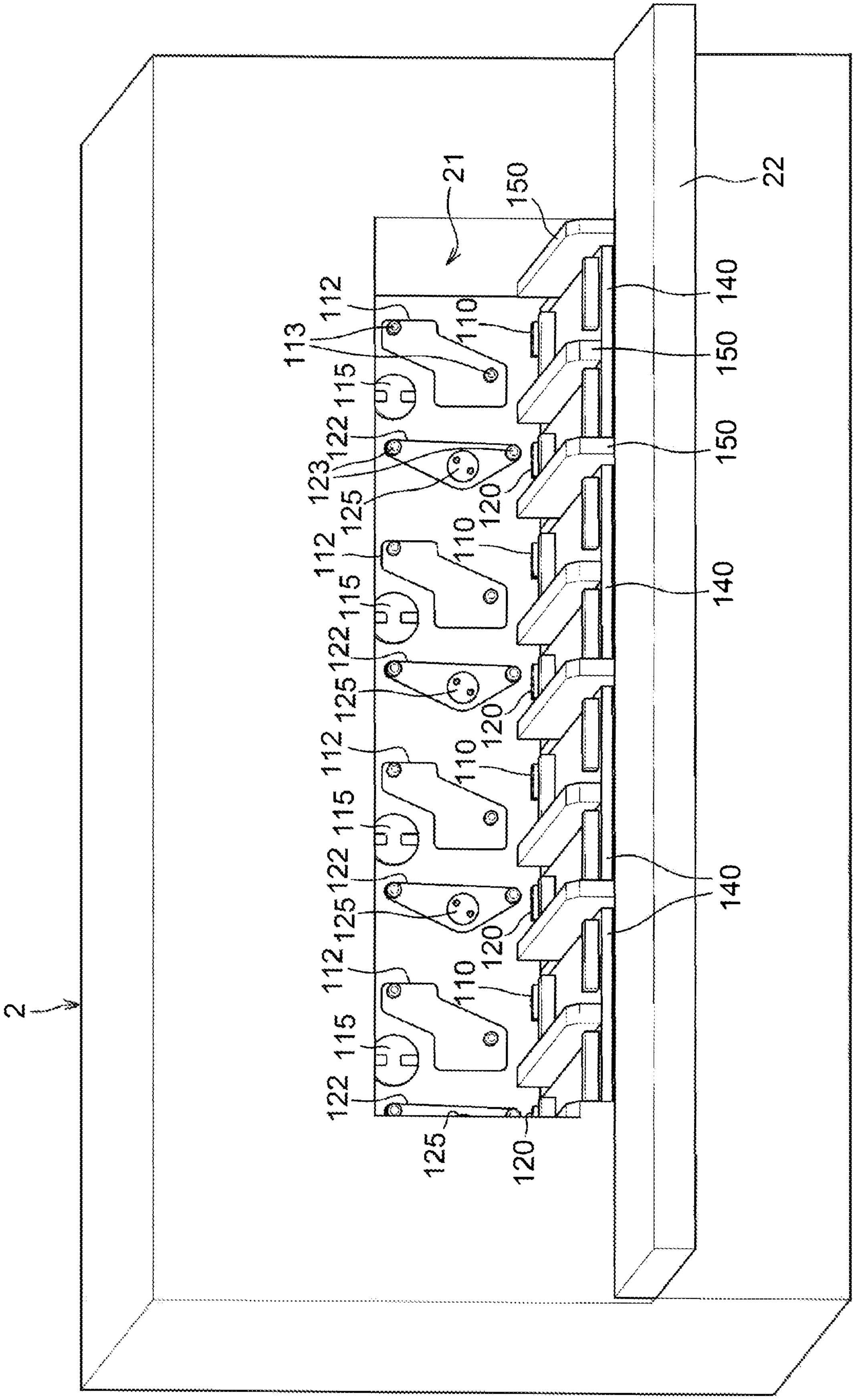
FIG. 2 is a perspective view of a main body casing of the image forming apparatus with a cover of the main body casing opened and illustrates the inside of the main body casing when viewed from an opening side.

As illustrated in FIG. 2, the main body casing 2 includes an opening 21 and a cover 22. The opening 21 opens to one side of the main body casing 2 in the axial direction. The opening 21 is configured to allow respective drum cartridges 400 and developing cartridges 500 to pass therethrough in the axial direction. In other words, the drum cartridges 400 are individually insertable into and removable from the main body casing 2 in the axial direction. The developing cartridges 500 are individually insertable into and removable from the main body casing 2 in the axial direction. The cover 22 is configured to cover and uncover the opening 21.

The main body casing 2 is configured to accommodate therein four drum cartridges 400 and four developing cartridges 500 at respective specific positions. The main body casing 2 further includes a plurality of, for example, nine guide walls 150 therein. The guide walls 150 partition an accommodating space into a plurality of cartridge spaces for the drum cartridges 400 and the developing cartridges 500, respectively.

The guide walls 150 may be partitions or dividing walls each protruding upward from a respective position proximity of a lower edge of the opening 21 and extending inside the main body casing 2 along the axial direction toward the back of the main body casing 2 from a proximity of the opening 21. The guide walls 150 define boundaries between cartridge spaces in the perpendicular direction. The guide walls 150 may function as guide rails that guide movement of respective cartridges during insertion or removal of the respective drum cartridges 400 and developing cartridges 500.

The main body casing 2 further includes, in each of the cartridge spaces for accommodating the respective drum cartridges 400, a first terminal 110, a first coupling plate 112, a plurality of, for example, two first positioning protrusions 113, and a drum drive coupling portion 115.

The first positioning protrusions 113 are fixed to respective particular positions of the first coupling plate 112. The first coupling plate 112 and the drum drive coupling portion 115 are positioned inside the main body casing 2 along a vertical back wall positioned apart from the opening 21 in the axial direction. The first coupling plate 112 and the drum drive coupling portion 115 are movable in the up-down direction.

The main body casing 2 further includes, in each of the cartridge spaces for accommodating the respective developing cartridges 500, a second terminal 120, a second coupling plate 122, a plurality of, for example, two second positioning protrusions 123, and a developing drive coupling portion 125.

The second positioning protrusions 123 are fixed to respective particular positions of the second coupling plate 122. The second coupling plate 122 and the developing drive coupling portion 125 are positioned inside the main body casing 2 along the vertical back wall positioned apart from the opening 21 in the axial direction. The second coupling plate 122 and the developing drive coupling portion 125 are movable in the up-down direction.

A support plate 140 is positioned below each cartridge space pair for a drum cartridge 400 and a developing cartridge 500 corresponding to each other. The support plate 140 extends in the perpendicular direction beyond both sides of a corresponding guide wall 150 partitioning the cartridge space pair into the cartridge spaces for the drum cartridge 400 and the developing cartridge 500. Each support plate 140 extends in the axial direction from a proximity of the lower edge of the opening 21 and parallel to the perpendicular direction. The first terminals 110 and the second terminals 120 are positioned at the respective support plates 140.

Figure 4:
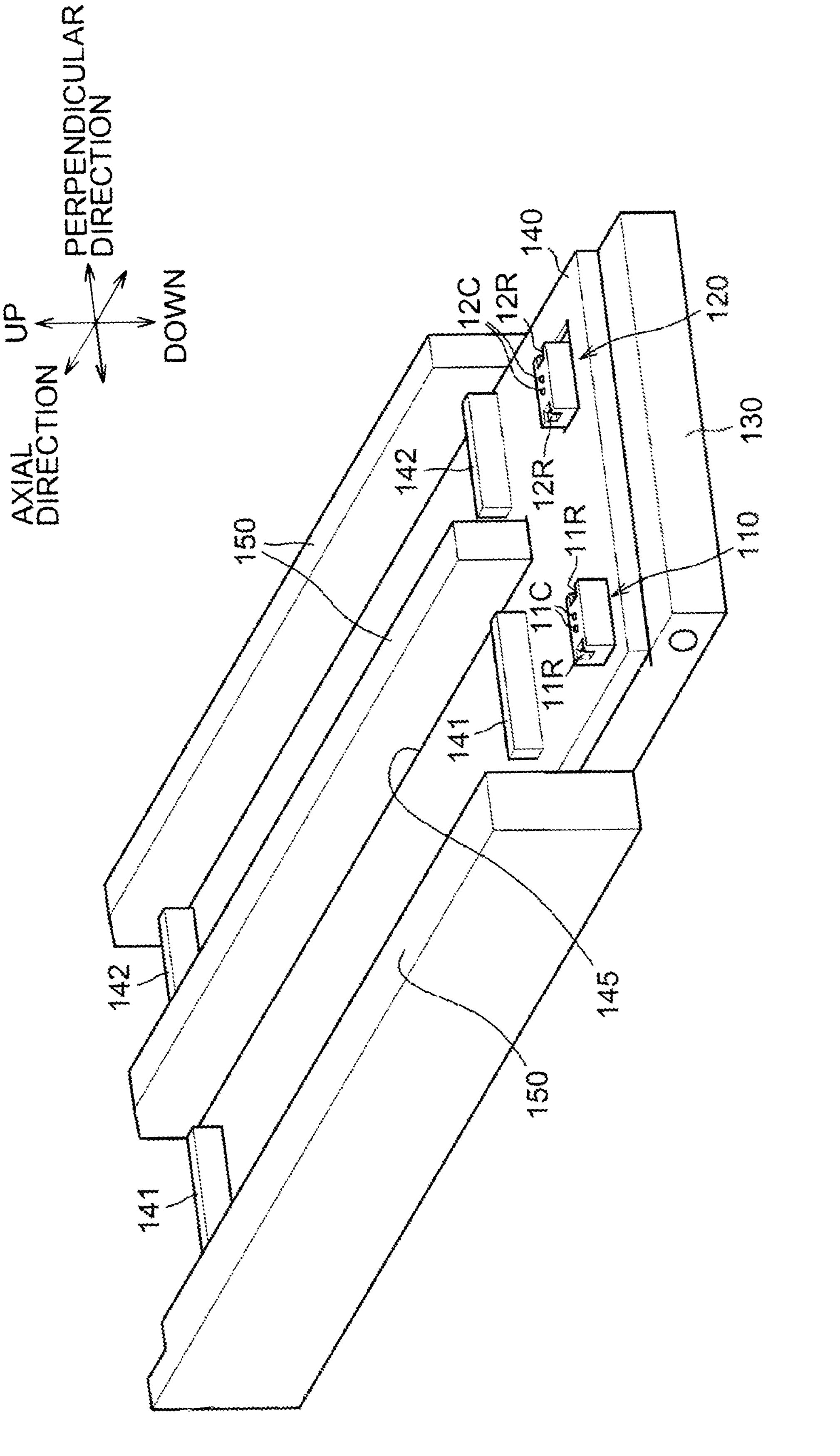
FIG. 4 is a perspective view of a support plate.

The first terminals 110 correspond to the respective drum cartridges 400. The second terminals 120 correspond to the respective developing cartridges 500. Each of the first terminals 110 and the second terminals 120 is connected to the controller 10 via a corresponding support plate 140. As illustrated in FIG. 4, each first terminal 110 has first terminal contacts 11C and engagement recesses 11R. Each second terminal 120 has second terminal contacts 12C and engagement recesses 12R.

Figure 3A:
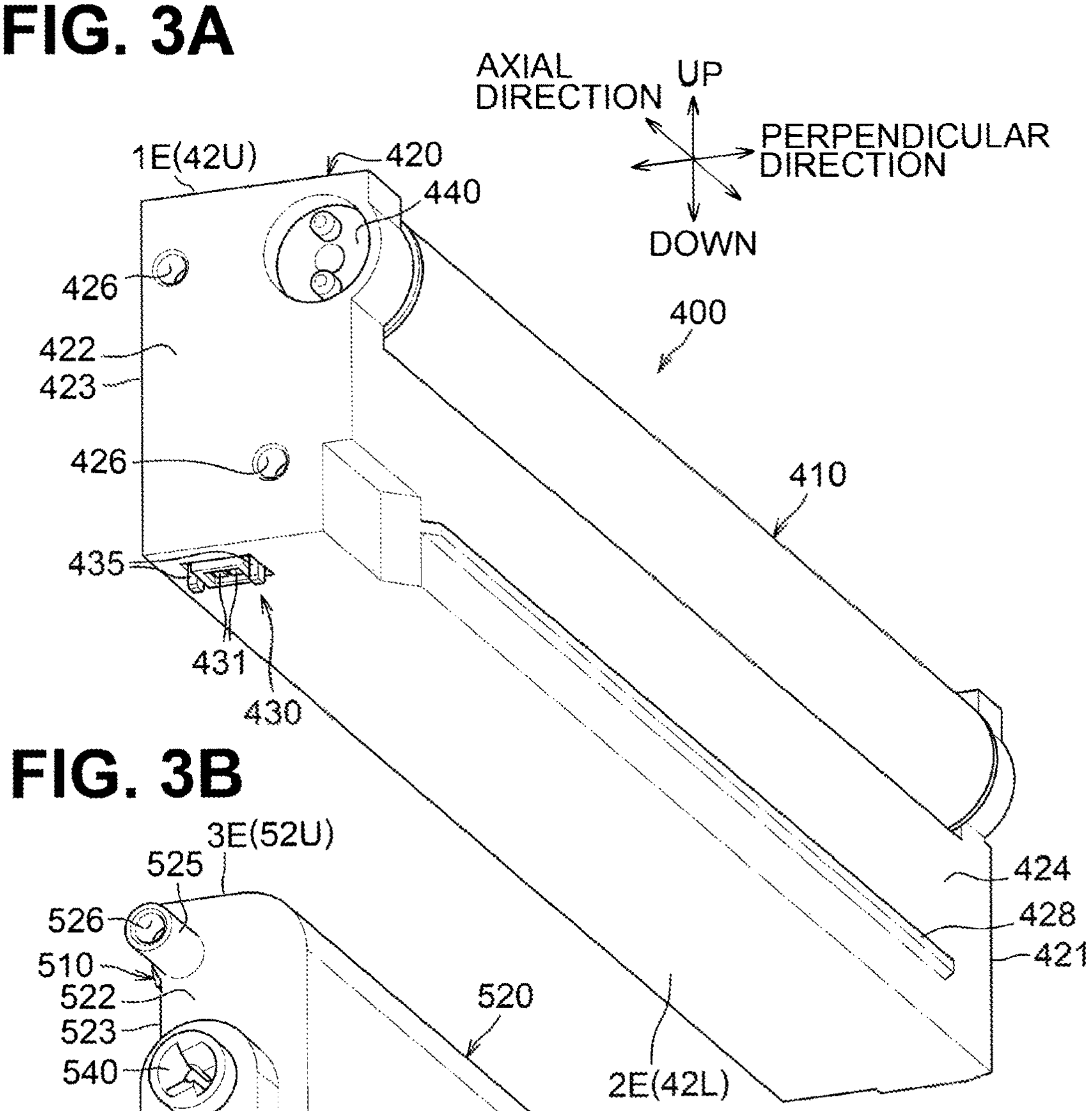
FIG. 3A is a perspective view of a drum cartridge.

Although, referring to FIG. 3A, a description will be provided on configurations of a drum frame 420 and a first memory 430 of one of the drum cartridges 400, the description may apply to the others. The drum frame 420 has a first end 1E and a second end 2E. A photosensitive drum 410 is located at the first end 1E. The second end 2E is apart from the first end 1E in the up-down direction in a state where the drum cartridge 400 is attached to the main body casing 2.

The drum frame 420 may have a hexahedral shape extending in the axial direction. The drum frame 420 has an upper end surface 42U, a lower end surface 42L, a first drum outer surface 421, a second drum outer surface 422, a third drum outer surface 423, and a fourth drum outer surface 424. The upper end surface 42U is located at the first end 1E. The lower end surface 42L is located at the second end 2E. The first drum outer surface 421, the second drum outer surface 422, the third drum outer surface 423, and the fourth drum outer surface 424 connect between the upper end surface 42U and the lower end surface 42L. The first drum outer surface 421 and the second drum outer surface 422 are apart from each other in the axial direction. The third drum outer surface 423 and the fourth drum outer surface 424 are apart from each other in the perpendicular direction.

The second drum outer surface 422 is farther from the opening 21 than the first drum outer surface 421 is from the opening 21 in the axial direction in a state where the drum cartridge 400 is attached to the main body casing 2. The third drum outer surface 423 is farther from a corresponding developing cartridge 500 including a developing roller 510 to be contacted by the photosensitive drum 410 of the drum cartridge 400 than the fourth drum outer surface 424 is from the corresponding developing cartridge 500 in the perpendicular direction in a state where the drum cartridge 400 and the developing cartridge 500 are attached to the main body casing 2.

The drum cartridge 400 further includes a drum coupling 440 and a plurality of, for example, two first positioning holes 426 at the second drum outer surface 422. The drum coupling 440 is configured to, in a state where the drum cartridge 400 is attached to the main body casing 2, be coupled to a corresponding drum drive coupling portion 115 (refer to FIG. 2) of the main body casing 2 and receive a drive force for rotating a photosensitive drum 410. The first positioning holes 426 are configured to, in a state where the drum cartridge 400 is attached to the main body casing 2, be engaged with the respective first positioning protrusions 113 (refer to FIG. 2) fixed to the first coupling plate 112 of the main body casing 2.

The first memory 430 is positioned at the second end 2E of the drum frame 420. In other words, the first memory 430 is positioned such that, in a state where the drum cartridge 400 is attached to the main body casing 2, the photosensitive drum 410 is positioned between the intermediate transfer belt 63 and the first memory 430 in the up-down direction (refer to FIG. 1). In the illustrative embodiment, preferably, the first memory 430 may be positioned at the lower end surface 42L. The outline of the second end 2E is not limited to the specific example. The second end 2E may have another outline. In other embodiments, for example, the first memory 430 may be positioned at a projecting portion or a recessed portion of the second end 2E but not at the lower end surface 42L.

The first memory 430 is positioned at the second end 2E of the drum frame 420 and at a position closer to the second drum outer surface 422 than to the first drum outer surface 421. That is, in a state where the drum cartridge 400 is attached to the main body casing 2, the first memory 430 is positioned at the back of the main body casing 2 far from the opening 21.

The first memory 430 includes a plurality of, for example, two first contacts 431 and a plurality of, for example, two engagement protrusions 435. In a case where the drum cartridge 400 is inserted into the main body casing 2, the engagement protrusions 435 are engaged with the respective engagement recesses 11R of the first terminal 110 to position the first memory 430 relative to the first terminal 110. Thus, the first contacts 431 contact the first terminal 110 (more specifically, the respective first terminal contacts 11C) to be electrically connected thereto.

Figure 5A:
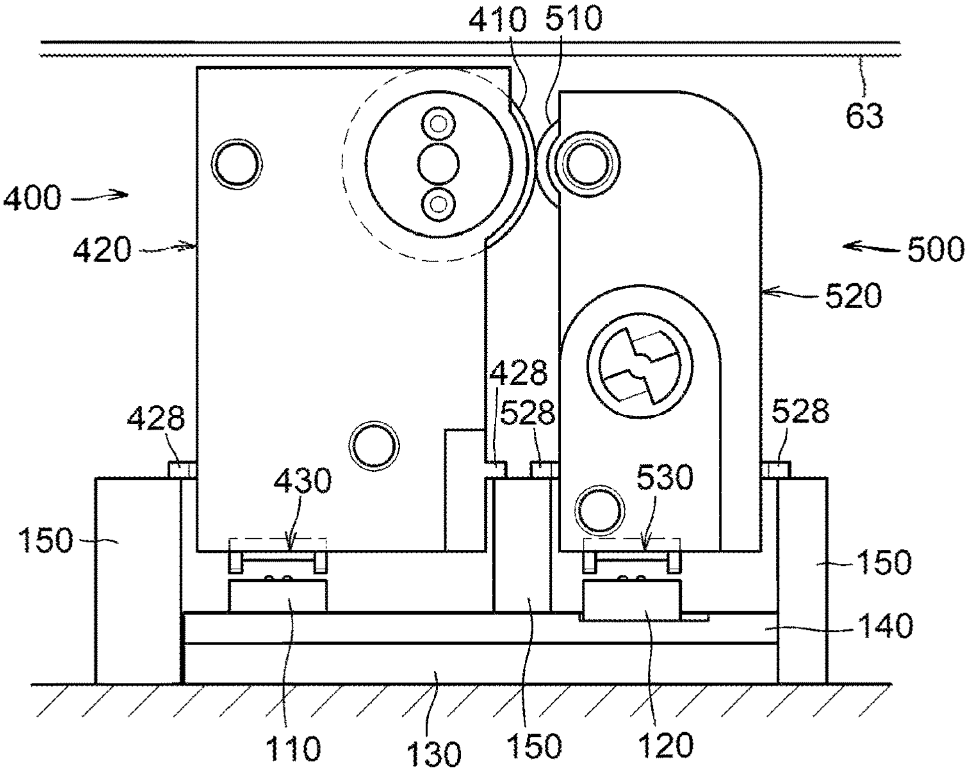
FIG. 5A is a side view of a drum cartridge and a corresponding developing cartridge when the cover of the main body casing is opened.
Figure 5B:
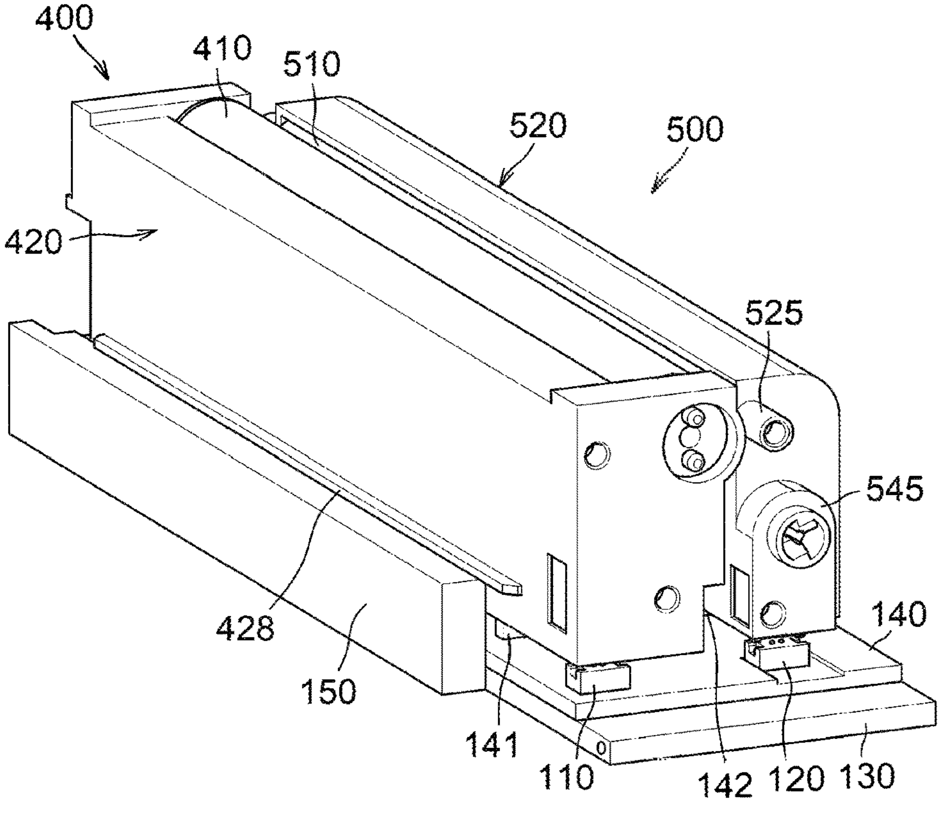
FIG. 5B is a perspective view of a drum cartridge and a corresponding developing cartridge when the cover of the main body casing is opened.

As illustrated in FIG. 3A, the photosensitive drum 410 is exposed from an opening defined in the upper end surface 42U and an upper portion of the second drum outer surface 422 of the drum frame 420. That is, the photosensitive drum 410 is positioned in a manner to be contactable to the intermediate transfer belt 63 and a corresponding developing roller 510. The drum frame 420 includes a rib 428 on the fourth drum outer surface 424. The rib 428 extends in the axial direction. As illustrated in FIGS. 5A and 5B, the drum frame 420 includes another rib 428 on the third drum outer surface 423. The rib 428 extends in the axial direction. The ribs 428 will be described later in detail.

Figure 3B:
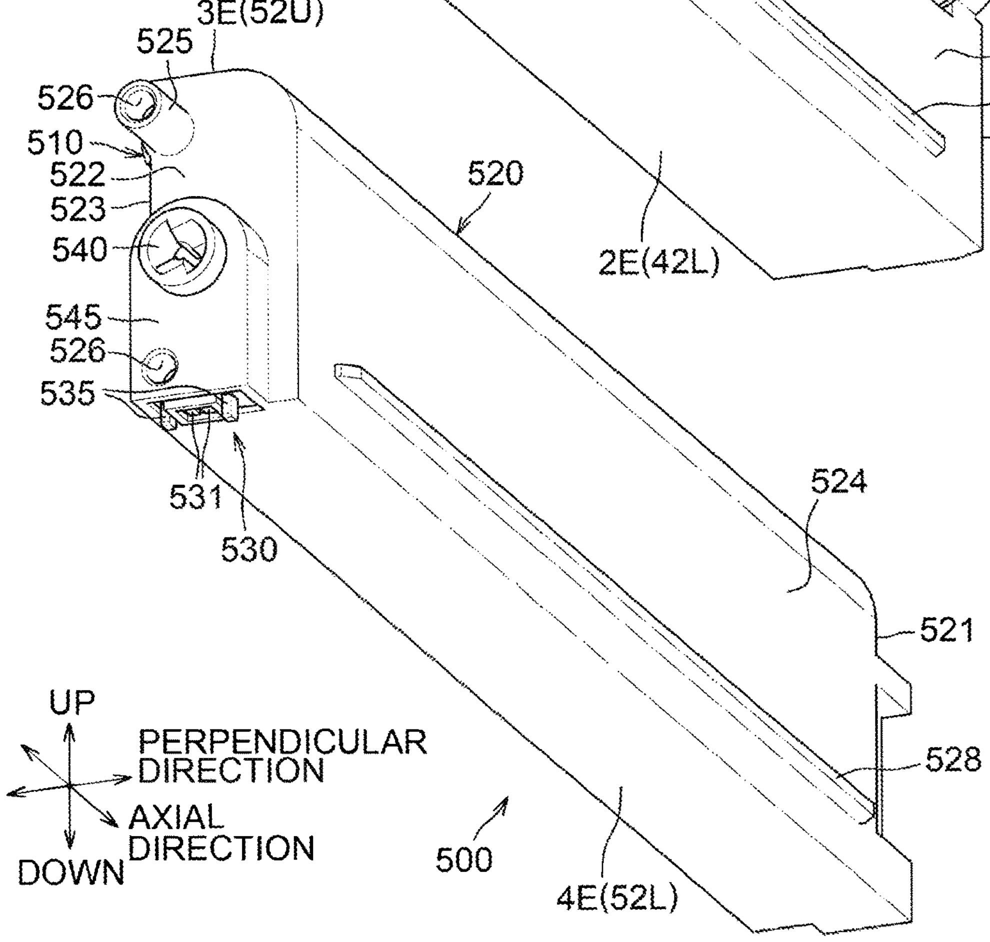
FIG. 3B is a perspective view of a developing cartridge.

Although, referring to FIG. 3B, a description will be provided on configurations of a developing frame 520 and a second memory 530 of one of the developing cartridges 500, the description may apply to the others. The developing frame 520 has a third end 3E and a fourth end 4E. A developing roller 510 is located at the third end 3E. The fourth end 4E is apart from the third end 3E in the up-down direction in a state where the developing cartridge 500 is attached to the main body casing 2.

The developing frame 520 may have a hexahedral shape extending in the axial direction. The developing frame 520 has an upper end surface 52U, a lower end surface 52L, a first developing outer surface 521, a second developing outer surface 522, a third developing outer surface 523, and a fourth developing outer surface 524. The upper end surface 52U is located at the third end 3E. The lower end surface 52L is located at the fourth end 4E. The first developing outer surface 521, the second developing outer surface 522, the third developing outer surface 523, and the fourth developing outer surface 524 connect between the upper end surface 52U and the lower end surface 52L.

The first developing outer surface 521 and the second developing outer surface 522 are apart from each other in the axial direction. The third developing outer surface 523 and the fourth developing outer surface 524 are apart from each other in the perpendicular direction.

The second developing outer surface 522 is farther from the opening 21 than the first developing outer surface 521 is from the opening 21 in the axial direction in a state where the developing cartridge 500 is attached to the main body casing 2. The third developing outer surface 523 is closer to a corresponding drum cartridge 400 including a photosensitive drum 410 to be contacted by the developing roller 510 of the developing cartridge 500 than the fourth developing outer surface 524 is to the corresponding drum cartridge 400 in the perpendicular direction in a state where the drum cartridge 400 and the developing cartridge 500 are attached to the main body casing 2.

The developing cartridge 500 further includes a positioning boss 525, a developing coupling 540, and a developing coupling cover 545 at the second developing outer surface 522. The developing coupling 540 is configured to, in a state where the developing cartridge 500 is attached to the main body casing 2, be coupled to a corresponding developing drive coupling portion 125 (refer to FIG. 2) of the main body casing 2 and receive a drive force for rotating a developing roller 510. The developing coupling cover 545 covers a periphery of the developing coupling 540. Each of the positioning boss 525 and the developing coupling cover 545 has a second positioning hole 526. The second positioning holes 526 are configured to, in a state where the developing cartridge 500 is attached to the main body casing 2, be engaged with the respective second positioning protrusions 123 (refer to FIG. 2) fixed to the second coupling plate 122 of the main body casing 2.

The second memory 530 is positioned at the fourth end 4E of the developing frame 520. In other words, the second memory 530 is positioned such that in a state where the developing cartridge 500 is attached to the main body casing 2, the developing roller 510 is located between the intermediate transfer belt 63 and the second memory 530 in the up-down direction (refer to FIG. 1). In the illustrative embodiment, preferably, the second memory 530 may be positioned at the lower end surface 52L. The outline of the fourth end 4E is not limited to the specific example. The fourth end 4E may have another outline. For example, in other embodiments, the second memory 530 may be positioned at a projecting portion or a recessed portion of the fourth end 4E but not at the lower end surface 52L.

The second memory 530 is positioned at the fourth end 4E of the developing frame 520 and at a position closer to the second developing outer surface 522 than to the first developing outer surface 521. That is, in a state where the developing cartridge 500 is attached to the main body casing 2, the second memory 530 is positioned at the back of the main body casing 2 far from the opening 21. In the illustrative embodiment, the second memory 530 may be positioned at a lower end surface of the developing coupling cover 545.

The second memory 530 includes a plurality of, for example, two second contacts 531 and a plurality of, for example, two engagement protrusions 535. In a case where the developing cartridge 500 is inserted into the main body casing 2, the engagement protrusions 535 are engaged with the respective engagement recesses 12R of the second terminal 120 to position the second memory 530 relative to the second terminal 120. Thus, the second contacts 531 contact the second terminal 120 (more specifically, the respective second terminal contacts 12C) to be electrically connected thereto.

As illustrated in FIG. 3B, the developing roller 510 is exposed from an opening defined in an upper portion of the third developing outer surface 523 of the developing frame 520. The developing roller 510 is positioned in a manner to be contactable to the intermediate transfer belt 63 and a corresponding photosensitive drum 410. The developing frame 520 includes a rib 528 on the fourth drum outer surface 424. The rib 528 extends in the axial direction. As illustrated in FIG. 5A, the developing frame 520 includes another rib 528 on the third developing outer surface 523. The rib 528 extends in the axial direction.

FIG. 4 illustrates one of the support plates 140, all of which may have the same configuration. Therefore, a detailed description will be provided on one of the support plates 140 representatively. The support plate 140 is slidable in the axial direction relative to a lift plate 130. The support plate 140 has a slit 145 at a middle portion in the perpendicular direction. The slit 145 allows a corresponding guide wall 150 to pass therethrough. The lift plate 130 and the support plate 140 are restricted from moving in the perpendicular direction by the guide walls 150 positioned on the opposite sides of both of the lift plate 130 and the support plate 140 in the perpendicular direction and the guide wall 150 positioned in the slit 145. The support plate 140 is further restricted from moving in the axial direction by the guide wall 150 passing through the slit 145. The lift plate 130 has a slit in a middle portion in the perpendicular direction. The slit of the lift plate 130 has a dimension greater than the guide wall 150 in the axial direction and is movable in the axial direction to allow a four-bar linkage mechanism to pivot the cover 22.

The lift plate 130 is movable up and down. In the illustrative embodiment, the up and down movement of the lift plate 130 may cause the support plate 140 to move up and down correspondingly, thereby moving the drum cartridge 400 and the developing cartridge 500 up and down simultaneously. The lift plate 130 has a plurality of openings. The lift plate 130 is configured to allow laser beams emitted by the exposure device SU to pass through the openings to expose the photosensitive drums 410 of the drum cartridges 400.

The support plate 140 includes first support blocks 141. The first support blocks 141 are closer to the opening 21 than the first terminal 110 is to the opening 21 in the axial direction (refer to FIG. 2). The first support blocks 141 are apart from each other in the axial direction. The support plate 140 further includes second support blocks 142. The second support blocks 142 are closer to the opening 21 than the second terminal 120 is to the opening 21 in the axial direction (refer to FIG. 2). The second support blocks 142 are apart from each other in the axial direction.

In a state where the drum cartridge 400 is attached to the main body casing 2, the support plate 140 is positioned below the drum cartridge 400 and support the drum cartridge 400 from below via the first support blocks 141. In a state where the developing cartridge 500 is attached to the main body casing 2, the support plate 140 is positioned below the developing cartridge 500 and support the developing cartridge 500 from below via the second support blocks 142. The first support blocks 141 have substantially the same height as the first terminal 110. The second support blocks 142 have substantially the same height as the second terminal 120.

The first terminal 110 is configured to electrically contact the first contacts 431 (refer to FIG. 3A) of the first memory 430 of the drum cartridge 400. Information stored in the first memory 430 may be sent to the controller 10 via the first terminal 110. The second terminal 120 is configured to electrically contact the second contacts 531 (refer to FIG. 3B) of the second memory 530 of the developing cartridge 500. Information stored in the second memory 530 may be sent to the controller 10 via the second terminal 120.

Hereinafter, a description will be provided on a configuration for inserting and removing one of the drum cartridges 400 and one of the developing cartridges 500, respectively, and the description may also apply to the others.

The support plate 140 is configured to move in the up-down direction between a drum separating position at which a photosensitive drum 410 is apart from the intermediate transfer belt 63 and a drum contacting position at which the photosensitive drum 410 is in contact with the intermediate transfer belt 63.

When the support plate 140 is located at the drum separating position (refer to FIGS. 5A and 5B), the drum cartridge 400 is supported by corresponding guide walls 150 via the ribs 428, the first memory 430 is apart from the first terminal 110, and the photosensitive drum 410 is apart from the intermediate transfer belt 63. The developing cartridge 500 is also supported by corresponding guide walls 150 via the ribs 528 and the second memory 530 is apart from the second terminal 120.

When the support plate 140 is located at the drum contacting position (refer to FIG. 6A), the drum cartridge 400 is supported by the first support blocks 141 (refer to FIG. 4) of the support plate 140, the first memory 430 is in contact with the first terminal 110, and the photosensitive drum 410 is in contact with the intermediate transfer belt 63. The developing cartridge 500 is supported by the second support blocks 142 (refer to FIG. 4) and the second memory 530 is in contact with the second terminal 120.

The developing cartridge 500 is configured to be slidable in the perpendicular direction relative to the second support blocks 142 by a separating mechanism. The developing cartridge 500 is movable between a developing-roller contacting position at which the developing roller 510 is in contact with a corresponding photosensitive drum 410 (refer to FIG. 6A) and a developing-roller separating position at which the developing roller 510 is apart from the photosensitive drum 410 (refer to FIG. 6B).

The second terminal 120 is attached in a manner to be movable in the perpendicular direction relative to the support plate 140. Thus, while the developing cartridge 500 attached to the main body casing 2 moves between the developing-roller separating position and the developing-roller contacting position, the second terminal 120 slides following the movement of the developing cartridge 500, thereby maintaining the contact between the second contacts 531 and the second terminal 120.

Figure 7A:
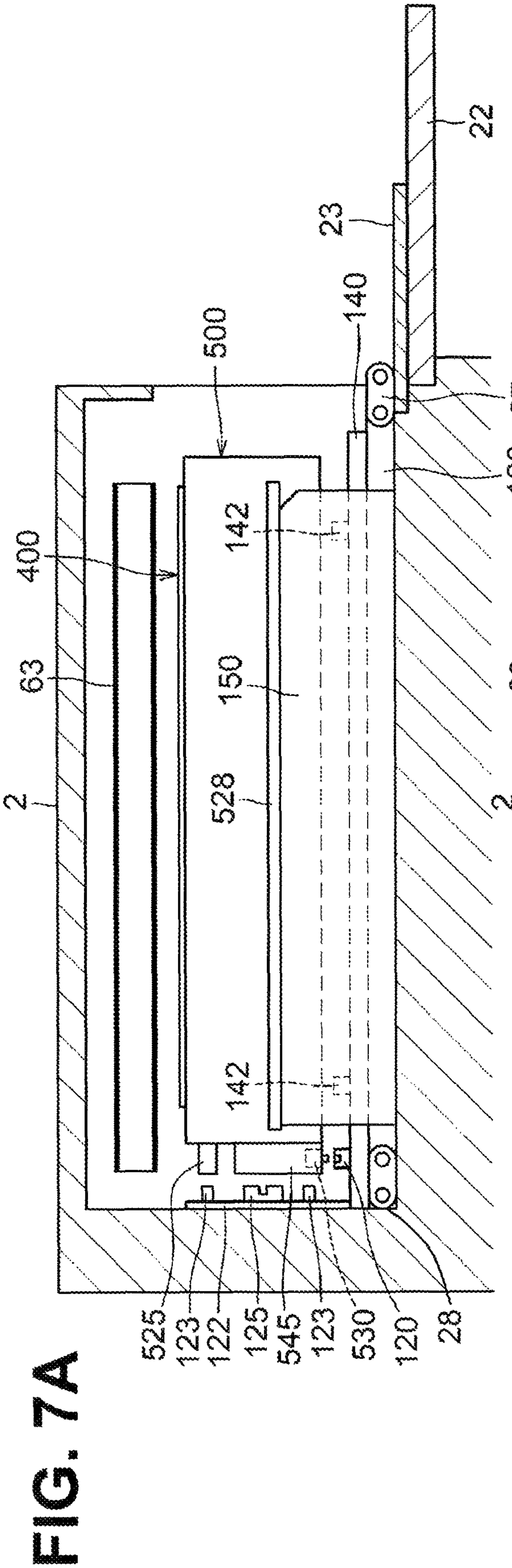
FIG. 7A illustrates inserting a drum cartridge and a developing cartridge into the main body casing.
Figure 7B:
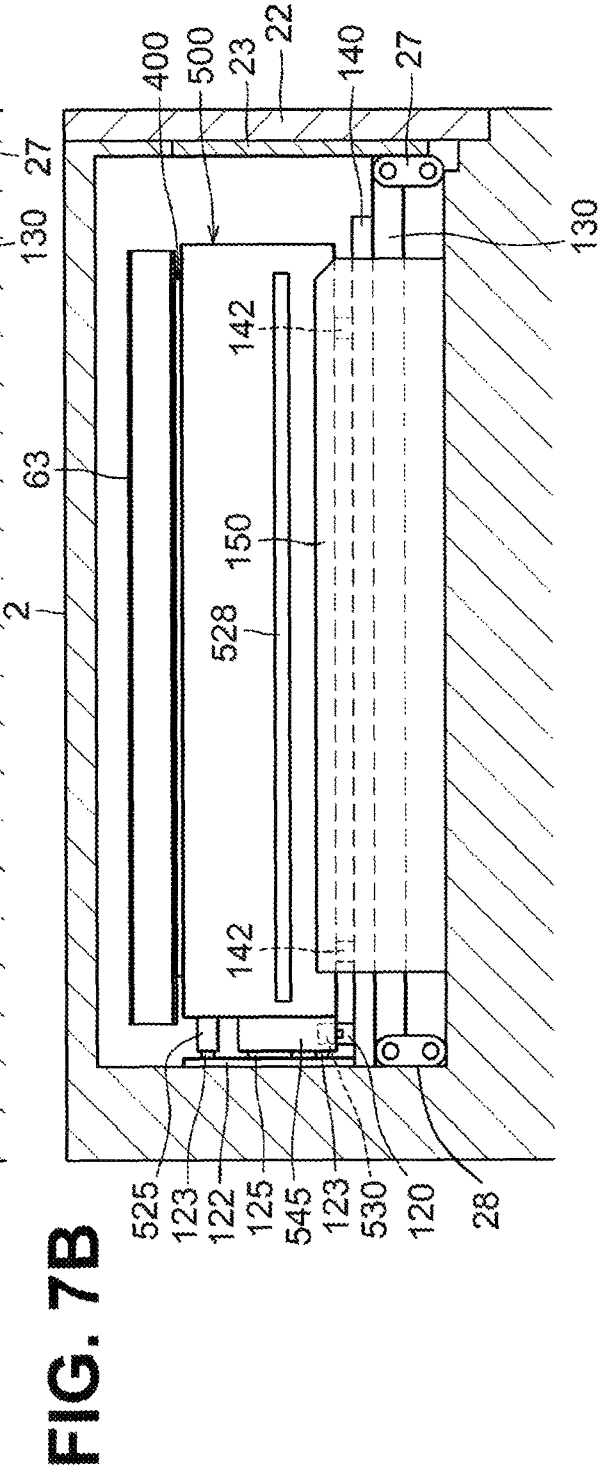
FIG. 7B illustrates a drum cartridge and a developing cartridge that are fully attached in response to closing of the cover of the main body casing is closed.

In the illustrative embodiment, the support plate 140 is movable between the drum separating position and the drum contacting position in conjunction with opening and closing of the cover 22 of the main body casing 2. As illustrated in FIGS. 7A and 7B, the main body casing 2 further includes an inner cover 23 at a surface, facing the opening 21, of the cover 22. The inner cover 23 is configured to pivot together with the cover 22. The lift plate 130 is positioned inside the main body casing 2. The support plate 140 is positioned above the lift plate 130.

The lift plate 130 is connected to the main body casing 2 via first links 27 and second links 28 to constitute a four-bar linkage mechanism. More specifically, for example, near ends of the lift plate 130 closer to the opening 21 than far ends thereof are to the opening 21 are connected to the main body casing 2 via the first links 27 and the far ends of the lift plate 130 are connected to the main body casing 2 via the second links 28. The first links 27 are fixed to the inner cover 23. With this configuration, in response to the movement of the cover 22 from the open position to the closed position, the inner cover 23 and the first links 27 pivot together to move the lift plate 130 upward to the position of the FIG. 7B together with the second links 28. At that time, the support plate 140 positioned on the lift plate 130 moves upward to the drum contacting position (refer to FIG. 6A).

Figure 6A:
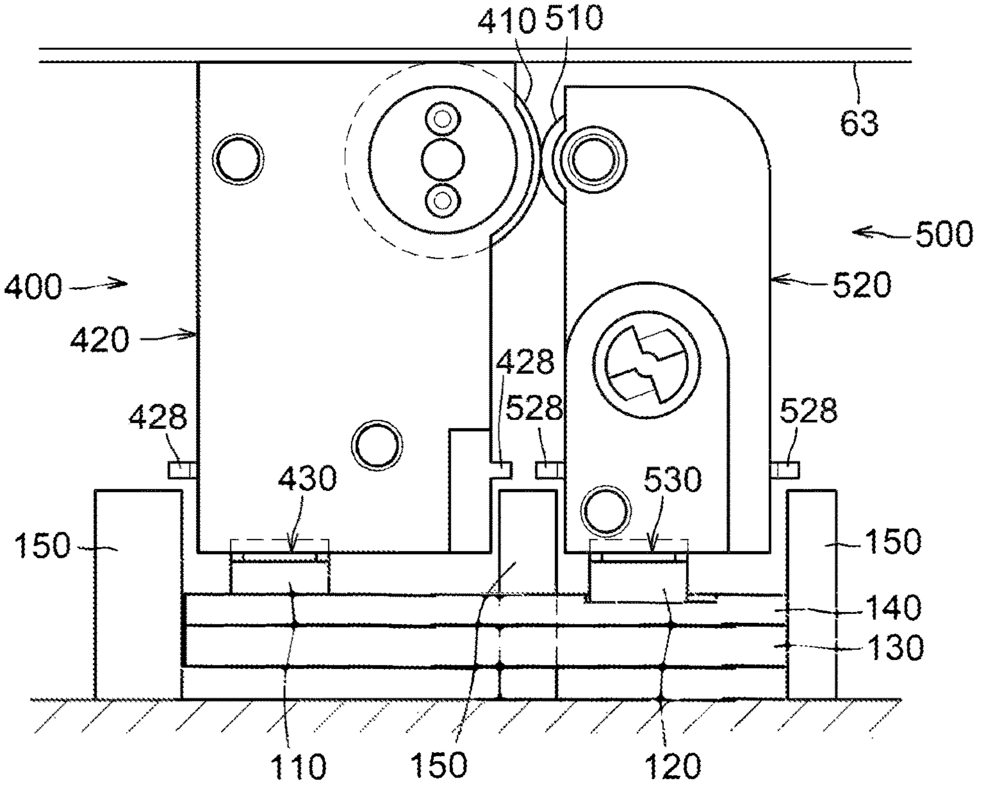
FIG. 6A is a side view of a drum cartridge and a corresponding developing cartridge located at a developing-roller contacting position after the drum cartridge and the developing cartridge are attached to the main body casing.
Figure 6B:
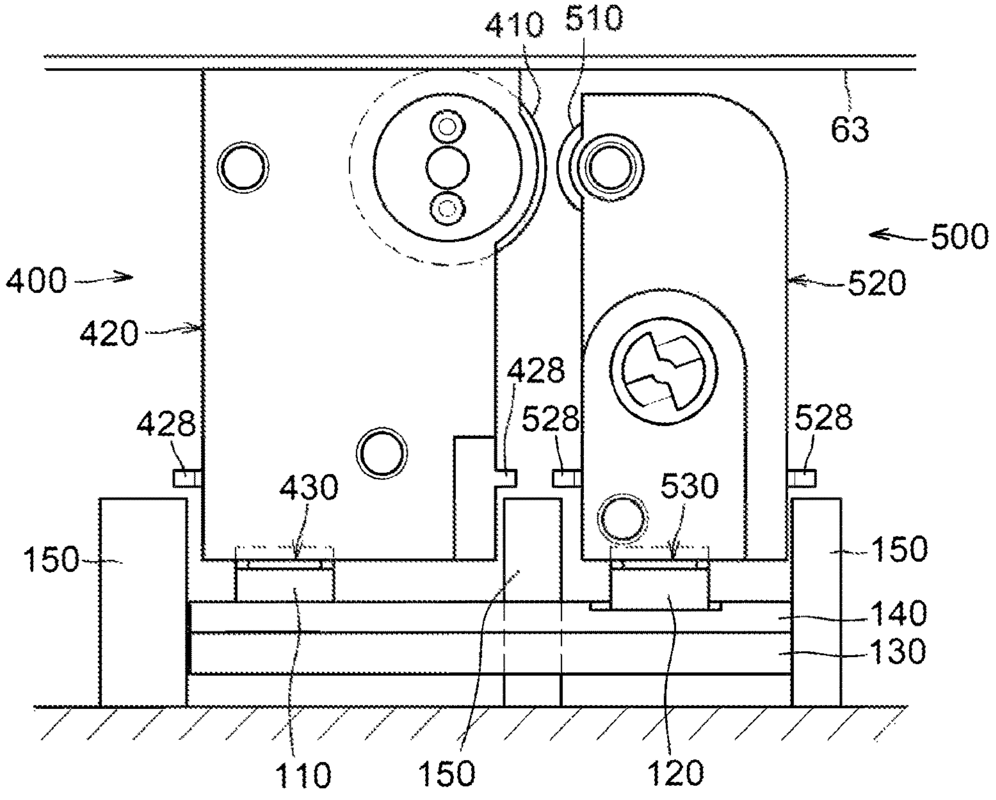
FIG. 6B is a side view of a drum cartridge and a corresponding developing cartridge located at a developing-roller separating position after the drum cartridge and the developing cartridge are attached to the main body casing.

As described above, in the illustrative embodiment, closing of the cover 22 may enable the drum cartridge 400 and the developing cartridge 500 to be attached to the main body casing 2, and as illustrated in FIG. 6A, the first memory 430 and the second memory 530 contact the first terminal 110 and the second terminal 120, respectively. In addition, at that time, the photosensitive drum 410 contacts the intermediate transfer belt 63.

FIGS. 6A and 7B each illustrate the drum cartridge 400 and the developing cartridge 500 that are fully attached to the main body casing 2 (hereinafter, such a state may be referred to as an attached state). In such a state, the support plate 140 is located at the drum contacting position.

In state where the support plate 140 is located at the drum contacting position, in response to opening of the cover 22 for removing one or both of the drum cartridge 400 and the developing cartridge 500 from the main body casing 2, as illustrated in FIGS. 5A and 5B, the lift plate 130 moves downward and thus the support plate 140 moves downward correspondingly. In response to the downward movement of the lift plate 130 and the support plate 140, both of the drum cartridge 400 and the developing cartridge 500 move downward and the ribs 428 of the drum cartridge 400 and the ribs 528 of the developing cartridge 500 contact upper ends of corresponding ones of the guide walls 150. The drum cartridge 400 and the developing cartridge 500 are thus supported by the corresponding guide walls 150.

Thereafter, the lift plate 130 further moves downward and thus the support plate 140 moves downward correspondingly. In response to this, the first terminal 110 and the second terminal 120 are separated from the first contacts 431 of the first memory 430 and the second contacts 531 of the second memory 530, respectively, and the attached state of the drum cartridge 400 and the developing cartridge 500 is thus discontinued. At that time, the support plate 140 is located at the drum separating position (refer to FIGS. 5A and 5B).

While the lift plate 130 and the support plate 140 move downward, the first coupling plate 112 and the drum drive coupling portion 115 move downward together with the drum cartridge 400 and the second coupling plate 122 and the developing drive coupling portion 125 move downward together with the developing cartridge 500.

Thus, the coupling between the drum coupling 440 and the drum drive coupling portion 115 and the coupling between the developing coupling 540 and the developing drive coupling portion 125 are maintained.

Thereafter, either one or both of the drum cartridge 400 and the developing cartridge 500 are pulled to disconnect the coupling. In a case where the drum cartridge 400 is pulled, the drum coupling 440 is disconnected from the drum drive coupling portion 115 (refer to FIG. 7A) and the drum cartridge 400 is removed from the main body casing 2 with the ribs 428 being slid along the corresponding guide walls 150. In a case where the developing cartridge 500 is pulled, the developing coupling 540 is disconnected from the developing drive coupling portion 125 and the developing cartridge 500 is removed from the main body casing 2 with the ribs 528 being slid along the corresponding guide walls 150.

For attaching the drum cartridge 400 to the main body casing 2, the ribs 428 of the third drum outer surface 423 and the fourth drum outer surface 424 are contacted to the corresponding guide walls 150 of the main body casing 2 first. More specifically, for example, end portions of the ribs 428 closer to the second drum outer surface 422 than to the first drum outer surface 421 are contacted to the corresponding guide walls 150 first. Then, the drum cartridge 400 is inserted into the main body casing 2 along the guide walls 150 (refer to FIG. 7A). Thereafter, the drum cartridge 400 is positioned in a state where the drum coupling 440 is coupled to the drum drive coupling portion 115 (refer to FIG. 2). During the insertion of the drum cartridge 400 into the main body casing 2, as illustrated in FIG. 5A, the support plate 140 is located at the drum separating position. Consequently, during the insertion of the drum cartridge 400, the photosensitive drum 410 and the drum frame 420 are apart from the intermediate transfer belt 63 and the first memory 430 might not contact the first terminal 110.

For attaching the developing cartridge 500 to the main body casing 2, the ribs 528 of the third developing outer surface 523 and the fourth developing outer surface 524 are contacted to the corresponding guide walls 150 of the main body casing 2 first. More specifically, for example, end portions of the ribs 528 closer to the second developing outer surface 522 than to the first developing outer surface 521 are contacted to the corresponding guide walls 150 first. Then, the developing cartridge 500 is inserted into the main body casing 2 along the guide walls 150 (refer to FIG. 7A). Then, the developing cartridge 500 is positioned in a state where the developing coupling 540 is coupled to the developing drive coupling portion 125 (refer to FIG. 2). During the insertion of the developing cartridge 500 into the main body casing 2, as illustrated in FIG. 5A, the support plate 140 is located at the drum separating position. Consequently, during the insertion of the developing cartridge 500, the developing frame 520 is separated from the intermediate transfer belt 63 and the second memory 530 might not contact the second terminal 120.

As illustrated in FIG. 7B, in response to closing of the cover 22, the support plate 140 moves upward from the drum separating position to return to the drum contacting position of FIG. 6A. Thus, the drum cartridge 400 and the developing cartridge 500 are fully attached to the main body casing 2 and become in the attached state.

According to the illustrative embodiment, the following effects may be achieved. The first memory 430 is positioned at the second end 2E of the drum frame 420. Such an arrangement might not limit a space for placing the first memory 430 as compared with a case where the first memory 430 is positioned at the leading end (e.g., the second drum outer surface 422) of the drum cartridge 400 having the drum coupling 440 and the first positioning holes 426 in the axial direction, thereby ensuring a sufficient contact area of each first contact 431 of the first memory 430. The second memory 530 is positioned at the fourth end 4E of the developing frame 520. Such an arrangement might not limit a space for placing the second memory 530 as compared with a case where the second memory 530 is positioned at the leading end (e.g., the second developing outer surface 522) of the developing cartridge 500 having the developing coupling 540 and the second positioning holes 526 in the axial direction, thereby ensuring a sufficient contact area of each second contact 531 of the second memory 530.

The first memory 430 is positioned at the position closer to the second drum outer surface 422 than to the first drum outer surface 421. That is, in a state where the drum cartridge 400 is attached to the main body casing 2, the first memory 430 is positioned at the back of the main body casing 2 far from the opening 21. Such a configuration may thus reduce or prevent a user from touching the first terminal 110 of the main body casing 2 accidentally during insertion or removal of the drum cartridge 400 into or from the main body casing 2. Such a configuration may further reduce or prevent the drum frame 420 from contacting the first terminal 110, and by extension a wearing out or damage caused by such a contact.

The second memory 530 is positioned at the position closer to the second developing outer surface 522 than to the first developing outer surface 521. That is, in a state where the developing cartridge 500 is attached to the main body casing 2, the second memory 530 is positioned at the back of the main body casing 2 far from the opening 21. Such a configuration may thus reduce or prevent a user from touching the second terminal 120 of the main body casing 2 accidentally during insertion or removal of the developing cartridge 500 into or from the main body casing 2. Such a configuration may further reduce or prevent the developing frame 520 from contacting the second terminal 120, and by extension a wearing out or damage caused by such a contact.

When the support plate 140 is located at the drum separating position, the first terminal 110 is apart from the first contacts 431 and the second terminal 120 is apart from the second contacts 531. When the support plate 140 is located at the drum contacting position, the first terminal 110 is in contact with the first contacts 431 and the second terminal 120 is in contact with the second contacts 531. With such a configuration, the memories (e.g., the first memory 430 and the second memory 530) may be connected to and disconnected from the respective main-body terminals (e.g., the first terminal 110 and the second terminal 120) in conjunction with the contacting and separating of the photosensitive drum 410 with respect to the intermediate transfer belt 63.

While the disclosure has been described in detail with reference to the specific embodiment thereof, these are merely examples, and various changes, arrangements and modifications may be applied therein without departing from the spirit and scope of the disclosure.

In the illustrative embodiment, the main body casing 2 is configured to allow four drum cartridges 400 and four developing cartridges 500 to be inserted thereinto and removed therefrom via a single opening 21. Nevertheless, in other embodiments, for example, a main body casing may have a plurality of openings. In one example, a main body casing may have one opening for each cartridge pair including a drum cartridge 400 and a developing cartridge 500 corresponding to each other. That is, the main body casing may have, for example, four openings. In another example, a main body casing may have first openings for the respective drum cartridges 400 and second openings for the respective developing cartridges 500. In the illustrative embodiment, the main body casing 2 includes a single cover 22. Nevertheless, in other embodiments, for example, a main body cover may include a plurality of covers. In one example, a main body casing may include one cover for each cartridge pair including a drum cartridge 400 and a developing cartridge 500 corresponding to each other. That is, the main body casing may include, for example, four covers. In another example, a main body casing may have first covers for respective first openings and second covers for respective second openings. That is, the main body casing may have, for example, four first covers and four second covers.

In the illustrative embodiment, the drum cartridge 400 and the developing cartridge 500 are moved up and down in conjunction with the opening and closing of the cover 22. Nevertheless, in other embodiments, for example, the support plate 140 may be configured to move between the drum contacting position and the drum separating position irrespective of the closing and opening of the cover.

In the illustrative embodiment, each support plate 140 is positioned below both of a corresponding drum cartridge 400 and a corresponding developing cartridge 500 and supports the drum cartridge 400 and the developing cartridge 500 from below. Nevertheless, in other embodiments, for example, drum-cartridge support plates may be positioned below respective corresponding drum cartridges 400 and support the respective drum cartridges 400, and developing-cartridge support plates may be positioned below respective corresponding developing cartridges 500 and support the respective developing cartridges 500. In such a case, the developing-cartridge support plates might not necessarily be movable in conjunction with an up-and-down movement of the drum-cartridge support plates. Nevertheless, in other embodiments, for example, the developing-cartridge support plates may be movable in conjunction with the up-and-down movement of the drum-cartridge support plates. With such a configuration, each first memory and each second memory may be connected to and disconnected from a corresponding main-body first terminal and a corresponding main-body second terminal, respectively, in conjunction with the contacting and separating of a corresponding photosensitive drum with respect to the intermediate transfer belt.

In the illustrative embodiment, the first memory 430 is positioned at the second end 2E (more specifically, for example, at the lower end surface 42L) and the second memory 530 is positioned at the fourth end 4E (more specifically, for example, at the lower end surface 52L). Nevertheless, in other embodiments, for example, at least one of the first memory or the second memory may be positioned at the lower end of the corresponding drum cartridge 400 or the corresponding developing cartridge 500.

The location of the first memory 430 at the lower end of the drum cartridge 400 is not limited to the specific example. In other embodiments, for example, the first memory may be positioned close to the opening of the main body casing in a state where the drum cartridge is attached to the main body casing. In still other embodiments, for example, unless the first memory is positioned above the first axis of the photosensitive drum, the first memory may be positioned at any location closer to the intermediate transfer belt than to the lower end of the drum cartridge. The location of the second memory 530 at the lower end of the developing cartridge 500 is not limited to the specific example. In other embodiments, for example, the second memory may be positioned close to the opening of the main body casing in a state where the developing cartridge is attached to the main body casing. In still other embodiments, for example, unless the second memory is positioned above the second axis of the developing roller, the second memory may be positioned at any location closer to the intermediate transfer belt than to the lower end of the developing cartridge. In the illustrative embodiment, the second memory 530 may be positioned at the lower end surface of the developing coupling cover 545. Nevertheless, in other embodiments, for example, the second memory may be positioned at any location closer to the opening of the main body casing than the developing coupling cover is to the opening of the main body casing.

In the illustrative embodiment, the perpendicular direction may be a direction perpendicular to the axial direction and the up-down direction. Nevertheless, in other embodiments, for example, the perpendicular direction may be a direction perpendicular to the axial direction but not perpendicular to the up-down direction.

In the above-described illustrative embodiments and modifications, the image forming apparatus 1 may be a color printer. Nevertheless, the disclosure is not limited to the color printer. In other embodiments, for example, the disclosure may be applied to other image forming apparatuses such as monochrome printers, copying machines, and multifunction devices.

The elements described in the respective illustrative embodiments or modifications may be combined to implement the disclosure.

What is claimed is:

1. A drum cartridge removably insertable into a main body casing included in an image forming apparatus through a first opening of the main body casing in a first direction, the drum cartridge being for use with a developing cartridge removably insertable into the main body casing thorough the first opening in the first direction, the drum cartridge comprising:

a photosensitive drum rotatable about a first axis extending in the first direction;

a drum frame rotatably supporting the photosensitive drum, the drum flame having:

a first end;

a second end apart from the first end in an up-down direction;

a lower end surface positioned at the second end;

a first drum outer surface; and a second drum outer surface apart from the first drum outer surface in the first direction, the second drum outer surface being positioned farther from the first opening than the first drum outer surface in the first direction in a state where the drum cartridge is attached to the main body casing; and a memory configured to store drum cartridge information, the memory being positioned at the lower end surface and positioned closer to the second drum outer surface than the first drum outer surface in the first direction.

2. The drum cartridge according to claim 1, further comprising:

a drum coupling configured to receive a first drive force for rotating the photosensitive drum, the drum coupling being positioned at the second drum outer surface.

3. The drum cartridge according to claim 2, wherein the drum coupling includes a first recessed portion.

* * * * *